Dec. 4, 1956   G. HAGEN   2,772,506
FISHING REEL PUMP DRIVES
Filed March 10, 1953   2 Sheets-Sheet 1
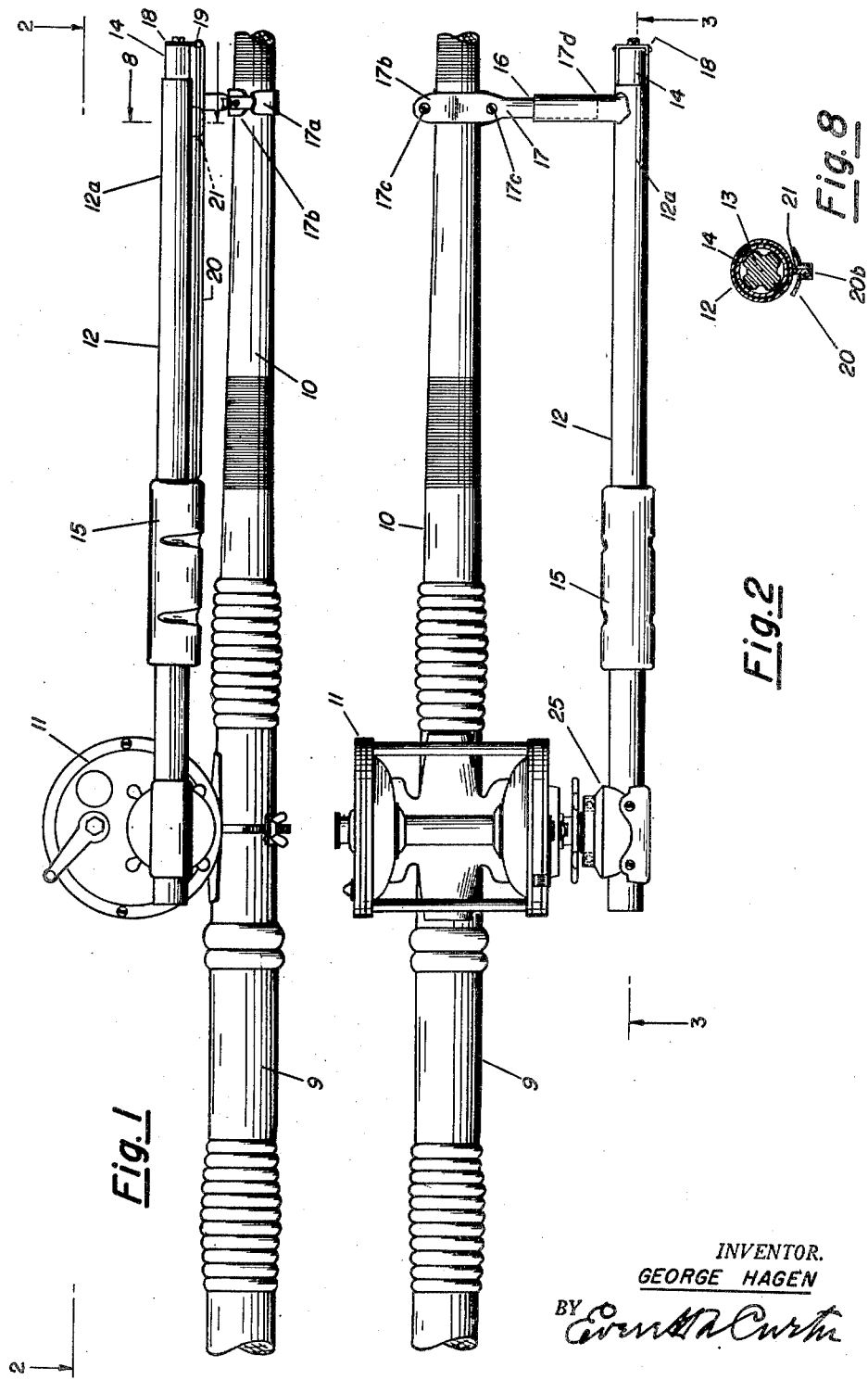
INVENTOR.
GEORGE HAGEN
BY
ATTORNEY Dec. 4, 1956   G. HAGEN   2,772,506
FISHING REEL PUMP DRIVES
Filed March 10, 1953   2 Sheets-Sheet 2
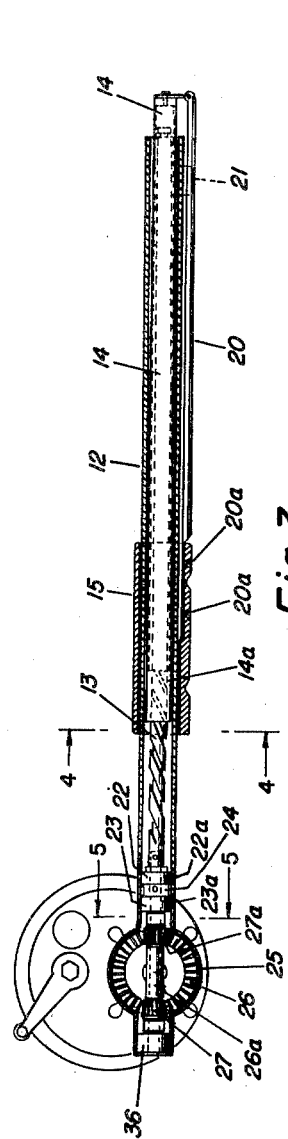
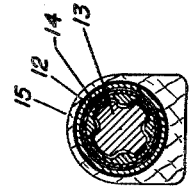
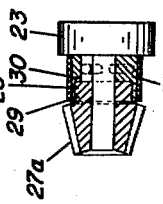
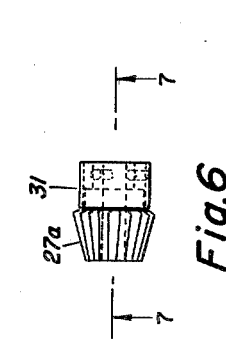
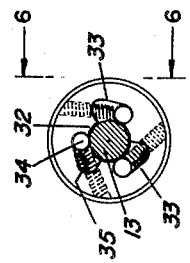
INVENTOR.
GEORGE HAGEN
BY *Everett N. Curtis*
ATTORNEY United States Patent Office 2,772,506
Patented Dec. 4, 1956

2,772,506

FISHING REEL PUMP DRIVES

George Hagen, San Diego, Calif.; Marguerite Hagen, administratrix of said George Hagen, deceased Application March 10, 1953, Serial No. 341,530

2 Claims. (Cl. 43—20)

My invention relates to fishing reel pump drives and its objects are to dispense with the crank commonly employed for the manual turning of the reel and to substitute therefor a reciprocating sliding handle operatively connected by a one way threaded drive shaft and improved gear train to the turning mechanism of said reel and effecting continuous rotation thereof; to guard against the possibility of interference with the reel turning mechanism, and against entanglements of the fishing line and undue wearing or breakage thereof; to bring about the easy running out and unimpeded reeling in of said line at all times and under all conditions normally encountered by the fisherman; to permit the device to be readily packed or stored away for transportation without allowance having to be made for a reel crank and associated projecting parts; to facilitate casting and the better handling of the fish when a strike has been accomplished; to allow intermittent pulling in of the line in conformance with the customary interrupted rush or darting progress of a minnow or other small fish represented by the bait; to secure greater flexibility and resiliency of the parts of the device when subjected to the usual stress and strain of fishing; to allow the device readily to be adjusted to be applied to conventional types of fishing reels now upon the market; to render the parts accessible for inspection, adjustment, replacement, restoration or repair, and generally to provide a fishing reel adapter which is simple and economical of construction, effective in action and of prolonged life and durability. My invention further consists of other novel features of construction and combination and combinations and arrangements of parts illustrated in the drawing and hereinafter more specifically pointed out and claimed.

Attention is hereby directed to the accompanying drawing illustrating a preferred form of my invention, in which similar numerals of designation refer to similar parts throughout the several views, and in which, Figure 1 is a side elevational view of the handle end of a conventional fishing pole and reel secured thereto, but otherwise having removably secured thereto, in place of the usual crank, and in accordance with my invention, a tubular casing to which is connected a reciprocating sliding handle secured to a sleeve within said casing and arranged for rotation of a one-way threaded drive shaft operatively connected by a bevel gear train continuously to drive the reel;

Fig. 2 is a plan view of the construction shown in Fig. 1, looking downwardly thereon in the direction indicated by the arrows 2—2;

Fig. 3 is a longitudinal section of the said casing shown in Fig. 2 looking in the direction indicated by the arrows 3—3, and showing in elevation the threaded drive shaft and gear train and connections with the reel, together with the reciprocating sliding handle and operative connections with the said shaft;

Fig. 4 is an enlarged sectional view of the drive shaft and actuating sliding sleeve mounted thereon, on line 4—4 of Fig. 3, looking in the direction indicated by the arrows;

Fig. 5 is a slightly enlarged sectional view of one of the driving collars, spring thrust actuated rollers and adjacent parts, on line 5—5 of Fig. 3, looking in the direction indicated by the arrows;

Fig. 6 is an enlarged side elevation of one of the pair of conical bevel gears mounted upon the drive shaft and meshing with the disc bevel gear operatively connected with the reel; the said pair of gears each incorporating therein the said driving collar and rollers therefor:

Fig. 7 is a longitudinal section of the conical bevel gears shown in Fig. 6, with said incorporated parts, and Fig. 8 is a lateral section on line 8—8 of Fig. 1 looking in the direction indicated by the arrows.

Referring to the drawing, I have there shown the handle 9 of a conventional fishing pole 10 upon which is mounted the usual form of reel 11, and to which is removably secured the attachment embodying my invention; such attachment comprising the tubular casing 12; the one-way threaded drive shaft 13 located within said casing; the tubular sleeve 14, having secured thereto the nut 14a threaded to engage with the threads of said shaft, said sleeve being in sliding engagement with the wall inside of said casing; the handle or forestock 15, connected with said sleeve; the securing bracket 16, and mechanism and gear train operatively connecting said shaft with the turning mechanism of the reel.

The tubular casing 12 is preferably in the form of an elongated cylinder of metal or other suitable material and is of sturdy construction; the outer end portion 12a of said casing being secured by the bracket 16 and clamp 17 to the adjacent shank of the fishing pole 10. This bracket is constructed of the tubular socket 17d secured to or integral with the end portion of said shank and shaped to receive the base of the clamp 17, the jaws 17a and 17b of which are formed to engage with the walls of the casing 12, and to be secured by the screws 17c.

The tubular sleeve 14 is also shown in the form of an elongated cylinder, preferably of the same material as the casing 12, and has its axis coincident therewith. It is positioned so that it normally occupies the greater extent of the hollow portion of said casing, and so that it slidably engages with the wall thereof. Press fitted or securely attached to the rear end of the said sleeve is the nut 14a, threaded to engage with the shaft 13; the axis of which shaft is coincident with that of said sleeve. Secured to the outer end of said sleeve 14 is the cap 18, having the lip 19 in pivotal engagement with the outer end of the extension 20, firmly secured by screws 20a to the handle or forestock 15. This extension 20 is in spaced parallel relation with the casing 12 and sleeve 14, and has a concave dished trough, having the channel 20b in the bottom thereof; which channel is shaped to engage with the lug 21 welded to the lower face of the casing 12, the said lug being located readily to be admitted within and to slide longitudinally along said channel. This arrangement of parts and sliding registration thereof, is such that upon the manual reciprocation of the handle 15, the shaft 13 will be caused to rotate through the longitudinal movement thereon and engagement therewith of the threaded nut 14a secured to sleeve 14.

The inner end portion of the shaft 13 is unthreaded and is journalled within and extends through the bearings 22 and 23, which bearings are located inside of the casing 12, and are removably secured to the wall thereof by screws 22a and 23a, or other suitable means; a collar 24 removably mounted upon said shaft serving to position and hold said bearings in spaced parallel relation. Further extending, the end of said shaft passes through and is journalled within bearings 26a of rounded gear box 25, forming the expanded rear end portion of the casing 12, and being shaped to receive the disc shaped bevel gear 26 mounted upon the shaft of the reel 11. Mounted to rotate solely in one direction upon shaft 13 within said gear box separated by the spacer sleeve 26a and meshing with the gear 26 are the pair of conical bevel gears 27 and 27a of identical construction, one of which 27a is particularly illustrated in Figs. 6 and 7.

As shown, the hub 28, of each of these bevel gears 27 and 27a is formed with the annular ledge 29, to which is press fitted the wall of the socket 30 of the driving collar 31, having formed therein the opening 32 a portion of the wall of which is in close contact with the shaft 13 (see Fig. 5), and the remainder of which wall is cut away or removed to form the arcuate tapered raceways 33 leading to said shaft and shaped to receive the rollers 34; expansion springs 35 embedded in said wall and therefrom protruding within said raceways to contact said rollers, serving continuously to cause said rollers to be thrust along said raceways in the direction of the narrowed ends thereof and to be wedged against the said shaft and to cause turning of said bevel gear upon rotation of said shaft in said narrowed direction, but releasing said gear from rotation upon the reverse movement of said shaft against the action of said springs.

As shown more particularly in Figs. 5 and 7, the arcuate raceways 33 (three in number) are circumferentially and equally spaced around, and lead tangentially, to the central opening 32 of the driving collar 31, each raceway being closed at its sides by the adjacent faces of the hub of the bevel gears 27 and 27a, and the faces of the bearings 23 or 36, so that each roller 34 is closely confined within the raceway and is normally in parallel relation with the shaft 13. Each of the expansion springs 35 is seated in a recess communicating with and leading into the broader end of the raceway; the free end of each spring being positioned to effect constant contact with the broad periphery of the roller of the recess and normally to tend to thrust said roller into wedging contact with the shaft 13. While in such wedging contact, the rotation of the shaft in the direction required to maintain such contact will positively cause the constant turning of the driving collar and attached bevel gear in the same direction; but as is obvious a reversal of said rotation of said shaft will release said wedging contact and allow the shaft to idle or turn freely within the central opening of said driving collar without effect upon its attached bevel gear. Since the bevel gears 27 and 27a are disposed to rotate in opposite directions but together coordinated to accomplish the rotation in one direction of the disc shaped bevel gear 26 with which they are meshed, the wedging contact of one or the other driving collars 31 thus simultaneously exerted will cause the continuous rotation of the gear 26 and that of the reel to which it is attached, upon the manual reciprocation of the handle 15.

To effect continuous drive of the shaft of the reel, the parts of the driving collar of the gear 27 are arranged to effect wedging contact with the said gear and extension of the shaft 13 when the handle 15 is moved backwardly in the direction of the said reel, while the parts of the driving collar of the gear 27a are at the same time released from their wedging contact with this gear and shaft extension, and caused to idle upon said extension. When, however, the handle 15 is moved away from the reel, the parts of the driving collar 27 are released from their wedging contacts, and the gear 27 caused to idle upon said extension, while the parts of the driving collar 31 of gear 27a are forced into wedging contact with said extension, and the shaft 13 continued in rotation in the same direction.

My invention may be embodied in other specific forms without departing from the spirit or essential characteristics thereof. The present embodiment, as above set forth is therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. A fishing reel pump drive for a fishing reel mounted upon a fishing pole, said drive including manually operated mechanism all parts of which are housed exteriorly of said pole and operatively connected to drive said reel, and said drive comprising an elongated cylindrical casing removably secured to said pole with one end adjacent to said reel; a one-way threaded shaft mounted to rotate within said casing; a single disc bevel gear and a pair of contacting conical bevel gears operatively connecting said shaft with said reel, each of said conical bevel gears having spring actuated roller thrust bearings positioned to be wedged against the said shaft and adapted intermittently to be released therefrom; a sleeve with connected nut threaded to engage with said shaft and mounted to slide longitudinally within said casing, and a handle slidably mounted to slide longitudinally outside of said casing, said handle having an extension coextensive with said sleeve and connected with the outer end thereof, and means connected with said casing for preventing the turning of said handle and extension thereof in relation to said casing and sleeve, and for securing said parts in undeviating longitudinal alignment.

2. A fishing reel pump drive for a fishing reel mounted upon a fishing pole, said drive including manually operated mechanism all parts of which are housed exteriorly of said pole and operatively connected to drive said reel, and said drive comprising an elongated cylindrical casing removably secured to said pole and having a gear box adjacent to said reel; a one-way threaded drive shaft mounted to rotate within said casing and having one end protruding within said gear box; a disc bevel gear secured to the shaft of said reel and located within said gear box; a pair of conical bevel gears mounted upon said shaft and meshing with said disc bevel gear; a driving collar closely surrounding said shaft and secured to each of said conical bevel gears, each of said collars having tapering cutout portions in the walls thereof leading to said shaft, and spring thrust rollers mounted to slide within said cutout portions and forcibly to contact said shaft upon rotation of said shaft in the direction of said thrust but adapted to be released from said contact upon rotation of said shaft in the opposite direction; a sleeve with attached nut threaded to engage with said shaft and mounted to slide longitudinally within said casing, and a handle slidably mounted longitudinally outside of said casing; said handle having a protruding arm coextensive with said sleeve and connected with the outer end thereof; and means connecting with said casing for preventing the turning of said handle and extension thereof in relation to said casing and sleeve, and for securing said parts in undeviating longitudinal alignment.

References Cited in the file of this patent

UNITED STATES PATENTS

| | | |
|---|---|---|
| 300,503 | Rascoe | June 17, 1884 |
| 733,836 | Hall et al. | July 14, 1903 |
| 1,142,574 | Huck | June 8, 1915 |
| 2,190,398 | Bugatti | Feb. 13, 1940 |